United States Patent
Zhang et al.

(10) Patent No.: US 9,904,345 B2
(45) Date of Patent: Feb. 27, 2018

(54) DATA PROCESSING METHOD, MODEM, AND TERMINAL

(71) Applicant: Huawei Device (Dongguan) Co., Ltd., Dongguan (CN)

(72) Inventors: Yue Zhang, Shanghai (CN); Peng Jiang, Shenzhen (CN); Qilin Li, Shanghai (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 425 days.

(21) Appl. No.: 14/561,019

(22) Filed: Dec. 4, 2014

(65) Prior Publication Data

US 2015/0106637 A1   Apr. 16, 2015

Related U.S. Application Data

(63) Continuation of application No. PCT/CN2013/085036, filed on Oct. 11, 2013.

(51) Int. Cl.
G06F 1/32 (2006.01)
G06F 13/00 (2006.01)
H04W 52/02 (2009.01)

(52) U.S. Cl.
CPC .......... *G06F 1/3218* (2013.01); *H04W 52/02* (2013.01); *H04W 52/027* (2013.01); *Y02B 60/50* (2013.01)

(58) Field of Classification Search
USPC ................. 709/200–207, 216–218, 223–234
See application file for complete search history.

(56) References Cited

U.S. PATENT DOCUMENTS

| 6,767,287 B1 * | 7/2004 | Mcquaid ................. A63F 13/12 463/29 |
| 6,854,012 B1 * | 2/2005 | Taylor ..................... H04L 41/22 709/224 |
| 9,167,528 B2 * | 10/2015 | Hsieh ................ H04W 52/0251 |
| 2008/0151762 A1 * | 6/2008 | Armstrong ............ H04W 24/08 370/241 |
| 2009/0278839 A1 * | 11/2009 | Geis ....................... G06Q 10/06 345/418 |
| 2010/0042856 A1 | 2/2010 | Tsai et al. |
| 2010/0146235 A1 | 6/2010 | Weber et al. |

(Continued)

FOREIGN PATENT DOCUMENTS

| CN | 101150811 A | 3/2008 |
| CN | 101888435 A | 11/2010 |

(Continued)

*Primary Examiner* — Jude Jean Gilles
(74) *Attorney, Agent, or Firm* — Slater Matsil, LLP

(57) ABSTRACT

The present invention discloses a data processing method, the method including obtaining an application packet sent by a network side device, obtaining a status of a screen of a terminal from a screen monitoring module in the terminal, where the status of the screen of the terminal includes a screen-on state and a screen-off state, and when the screen is in the screen-off state, skipping waking up an application processor, and temporarily storing the obtained application packet. In the data processing method provided by embodiments of the present invention, when it is obtained that the screen is in the screen-off state, the obtained application packet is temporarily stored, and an AP is not woken up, thereby reducing power consumption of the terminal.

16 Claims, 13 Drawing Sheets

(56) References Cited

U.S. PATENT DOCUMENTS

| | | |
|---|---|---|
| 2010/0322124 A1 | 12/2010 | Luoma |
| 2011/0007679 A1* | 1/2011 | Tsai ........................ H04M 1/73 |
| | | 370/311 |
| 2011/0072367 A1* | 3/2011 | Bauer ................. G06F 3/04815 |
| | | 715/757 |
| 2012/0009930 A1 | 1/2012 | Brisebois et al. |
| 2012/0149352 A1 | 6/2012 | Backholm et al. |
| 2012/0272230 A1 | 10/2012 | Lee |
| 2013/0005333 A1* | 1/2013 | Chueh ................... H04W 36/24 |
| | | 455/426.1 |
| 2013/0059570 A1 | 3/2013 | Hara et al. |
| 2013/0332589 A1* | 12/2013 | Zhong ....................... G06F 9/46 |
| | | 709/223 |
| 2014/0161011 A1 | 6/2014 | Hara et al. |
| 2014/0235257 A1* | 8/2014 | Hannu .............. H04W 52/0225 |
| | | 455/450 |

FOREIGN PATENT DOCUMENTS

| | | |
|---|---|---|
| CN | 102804899 A | 11/2012 |
| CN | 103327585 A | 9/2013 |
| EP | 2154922 A1 | 2/2010 |
| EP | 2434802 A1 | 3/2012 |
| JP | 2010044732 A | 2/2010 |
| JP | 2011066476 A | 3/2011 |
| JP | 2013055496 A | 3/2013 |
| WO | 2013024553 A1 | 2/2013 |

\* cited by examiner

DATA PROCESSING METHOD, MODEM, AND TERMINAL

This application is a continuation of International Application PCT/CN2013/085036, filed on Oct. 11, 2013, which is hereby incorporated by reference in its entirety.

TECHNICAL FIELD

The present invention relates to the field of communications technologies, and in particular, to a data processing method, a modem, and a terminal.

BACKGROUND

A terminal includes a modem and an application processor (AP). Application data received by the terminal is received by the modem and pushed (Push) to the AP. As a technology that can actively push data to a terminal, push has rapidly become popular in mobile Internet devices.

If the terminal connects to a network by using the modem and retains this state for a long time, many application programs that run on the AP side and require a push service wait for data. These programs register themselves with a push agent (Push Agent) on the AP side. The push agent establishes a connection that is between a socket (Socket) and a remote push server (Push Server) and is retained for a long time. The push agent registers, with the push server, information about the application programs on the AP side that require the push service, and at the same time, waits for data sent by the push server.

It is found in research and practice processes of the prior art, that when data sent by the push server arrives, the modem receives the data first, wakes up the AP, and sends the data to the AP. When push data arrives frequently, the AP is woken up by the modem frequently. Power consumption of the AP accounts for a greatest proportion in the entire terminal, and therefore, frequent wakeups of the AP increase average power consumption of the terminal.

SUMMARY

Embodiments of the present invention provide a data processing method, which can reduce the number of times an AP is woken up, thereby reducing power consumption of a terminal. The embodiments of the present invention further provide a corresponding modem and terminal.

A first aspect of the present invention provides a data processing method, the method including obtaining an application packet sent by a network side device, obtaining a status of a screen of a terminal from a screen monitoring module in the terminal. The status of the screen of the terminal includes a screen-on state and a screen-off state. When the screen is in the screen-off state, skipping waking up an application processor, and temporarily storing the obtained application packet.

In some embodiments, after the temporarily storing the obtained application packet, the method further includes continually obtaining the status of the screen of the terminal from the screen monitoring module. When it is obtained that the status of the screen changes from the screen-off state to the screen-on state, the method further includes waking up the application processor, and pushing, to the application processor, the application packet temporarily stored between the previous screen-off state and the current screen-on state.

In some embodiments, when temporarily storing the obtained application packet, the method further includes starting timing when a first obtained application packet is temporarily stored, and when a preset time is reached, and the screen is in the screen-off state since the start timing, waking up the application processor, and pushing the application packets temporarily stored within the preset time to the application processor.

In some embodiments, when temporarily storing the obtained application packet, the method further includes monitoring a total amount of memory occupied by the temporarily stored application packets, and when the total amount of memory reaches a preset amount, and the screen is in the screen-off state, waking up the application processor, and pushing the temporarily stored application packets to the application processor.

In some embodiments, the method further includes when it is obtained that the screen is in the screen-on state, waking up the application processor, and pushing the obtained application packet to the application processor.

In some embodiments, the obtaining an application packet sent by a network side device includes receiving a protocol application packet sent by the network side device, where the protocol application packet is encoded by a network side device and the terminal by a negotiation protocol, and parsing the protocol application packet in a decoding manner corresponding to the negotiated encoding, and obtaining the application packet.

In some embodiments, the pushing the temporarily stored application packets to the application processor includes pushing the temporarily stored application packets to the application processor in an order in which the application packets are temporarily stored.

A second aspect of the present invention provides a modem, including a first obtaining unit configured to obtain an application packet sent by a network side device, and a second obtaining unit configured to obtain a status of a screen of a terminal from a screen monitoring module in the terminal, where the status of the screen of the terminal includes a screen-on state and a screen-off state. The modem further includes a buffer unit, configured to: when the status of the screen obtained by the second obtaining unit is the screen-off state, skip waking up an application processor, and temporarily store the obtained application packet.

In some embodiments, the second obtaining unit is further configured to: after the buffer unit temporarily stores the obtained application packet, continually obtain the status of the screen of the terminal from the screen monitoring module. In these embodiments, the modem further includes a first wakeup unit, configured to: when the second obtaining unit obtains that the status of the screen changes from the screen-off state to the screen-on state, wake up the application processor, and a first push unit, configured to push, to the application processor woken up by the first wakeup unit, the application packet temporarily stored between the previous screen-off state and the current screen-on state.

In some embodiments, the modem further includes a start unit, configured to start timing when the buffer unit temporarily stores a first application packet obtained by the first obtaining unit, a second wakeup unit, configured to: when a preset time is reached and the screen is in the screen-off state since after the start unit starts timing, wake up the application processor. In these embodiments, the modem further includes a second push unit, configured to push the application packets temporarily stored within the preset time to the application processor woken up by the second wakeup unit.

In some embodiments, the modem further includes a monitoring unit, configured to monitor a total amount of memory that is occupied by the application packets temporarily stored by the buffer unit, a third wakeup unit, configured to: when the total amount of memory monitored by the monitoring unit reaches a preset amount, and the screen is in the screen-off state, wake up the application processor, and a third push unit, configured to push the temporarily stored application packets to the application processor woken up by the third wakeup unit.

In some embodiments, the modem further includes a fourth wakeup unit, configured to: when the second obtaining unit obtains that the screen is in the screen-on state, wake up the application processor, and a fourth push unit, configured to push, to the application processor woken up by the fourth wakeup unit, the application packet obtained by the first obtaining unit.

In some embodiments, the first obtaining unit includes a receiving subunit, configured to receive a protocol application packet sent by the network side device, where the protocol application packet is encoded by a network side device and the terminal by a negotiation protocol, and a parsing subunit, configured to parse, in a decoding manner corresponding to the negotiated encoding, the protocol application packet received by the receiving subunit, and obtain the application packet.

A third aspect of the present invention provides a modem, including an input device, an output device, a processor, and a memory. In this modem the input device is configured to obtain an application packet sent by a network side device, the processor is configured to obtain a status of a screen of a terminal from a screen monitoring module in the terminal, where the status of the screen of the terminal includes a screen-on state and a screen-off state, the memory is configured to: when it is obtained that the screen is in the screen-off state, temporarily store the obtained application packet, and the processor skips waking up an application processor.

In some embodiments, the processor is further configured to: after the memory temporarily stores the obtained application packet, continually obtain the status of the screen of the terminal from the screen monitoring module; and when it is obtained that the status of the screen changes from the screen-off state to the screen-on state, wake up the application processor, and the output device is configured to push, to the application processor, the application packet temporarily stored between the previous screen-off state and the current screen-on state.

In some embodiments, the processor is further configured to: start timing when the memory temporarily stores a first obtained application packet, and when a preset time is reached, and the screen is in the screen-off state since the start timing, wake up the application processor, and the output device is further configured to push the application packets temporarily stored within the preset time to the application processor.

In some embodiments, the processor is further configured to: monitor a total amount of memory that is occupied by the application packets temporarily stored by the memory; and when the total amount of memory reaches a preset amount, and the screen is in the screen-off state, wake up the application processor, and the output device is further configured to push the temporarily stored application packets to the application processor.

In some embodiments, the processor is further configured to: when it is obtained that the screen is in the screen-on state, wake up the application processor, and the output device is further configured to push the obtained application packet to the application processor.

In some embodiments, the input device is configured to receive a protocol application packet sent by the network side device, where the protocol application packet is encoded by a network side device and the terminal by a negotiation protocol, and the processor is further configured to parse the protocol application packet in a decoding manner corresponding to the negotiated encoding, and obtain the application packet.

In some embodiments, the output device is configured to push the temporarily stored application packets to the application processor in an order in which the application packets are temporarily stored.

A fourth aspect of the present invention provides a terminal, including a modem, an application processor, and a screen monitoring module. In this terminal, the screen monitoring module is configured to monitor a status of a screen of the terminal, where the status of the screen of the terminal includes a screen-on state and a screen-off state, the application processor is configured to receive an application packet sent by the modem after being woken up by the modem, and the modem is the modem described in technical solutions.

In embodiments of the present invention, a modem in a terminal is used to obtain an application packet sent by a network side device, the modem obtains a status of a screen of the terminal from a screen monitoring module in the terminal, where the status of the screen of the terminal includes a screen-on state and a screen-off state, and when the screen is in the screen-off state, an application processor is not woken up, and the obtained application packet is temporarily stored. Compared with the prior art in which an AP is woken up each time an application packet is obtained, in the data processing method according to embodiments of the present invention, when it is obtained that the screen is in the screen-off state, the obtained application packet is temporarily stored and the AP is not woken up, thereby reducing power consumption of the terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still obtain other drawings from these accompanying drawings without creative efforts.

DETAILED DESCRIPTION OF ILLUSTRATIVE EMBODIMENTS

Embodiments of the present invention provide a data processing method, which can reduce the number of times an AP is woken up, thereby reducing power consumption of a terminal. The embodiments of the present invention further provide a corresponding modem and terminal. The following provides detailed descriptions separately.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

The terminal in the embodiments of the present invention may be any terminal in which the modem provided by the embodiments of the present invention is installed, such as a mobile phone, a tablet computer, a personal digital assistant (PDA), or a vehicle-mounted device.

Figure 1:
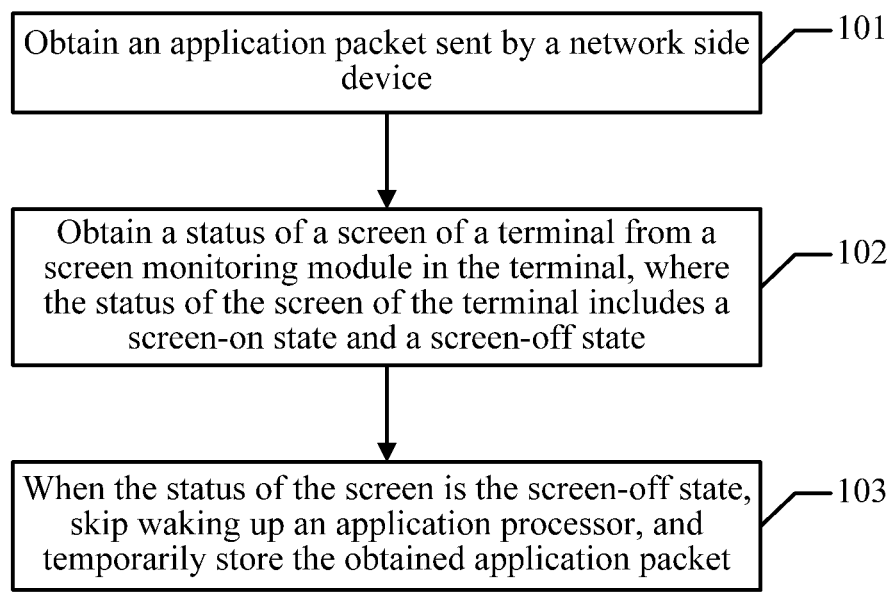
FIG. 1 is a schematic diagram of an embodiment of a data processing method according to the present invention.

Referring to FIG. 1, an embodiment of a data processing method according to an embodiment of the present invention is illustrated. Step 101 includes obtaining an application packet sent by a network side device.

The network side device in the embodiment of the present invention is an application server of various applications. The application server sends an application packet of a terminal to a modem in the terminal. In fact, the modem initially receives a protocol application packet. The modem first parses the protocol application packet according to the Point-to-Point Protocol (PPP) specified in the 3rd Generation Partnership Project (3GPP). In fact, a parsing process is implemented to: remove a packet header from the protocol application packet, such as an identifier of the application server that sends the application packet; subsequently, perform parsing according to the Transmission Control Protocol/Internet Protocol (TCP/IP), which is equivalent to further removing information such as an IP address of the terminal that is carried in the protocol application packet; and finally obtain the application packet required by an AP.

Step 102 includes obtaining a status of a screen of a terminal from a screen monitoring module in the terminal, where the status of the screen of the terminal includes a screen-on state and a screen-off state.

The screen monitoring module in the terminal monitors the status of the screen all the time, such as screen-on or screen-off, and notifies the modem of information about the status of the screen, so that the modem obtains the status of the screen of the terminal.

Step 103 includes when the screen is in the screen-off state, skip waking up the application processor, and temporarily store the obtained application packet.

When it is obtained that the screen is in the screen-off state, it indicates that a user does not use the terminal. Even if the application packet is pushed to the AP, the user does not view it at once. In order not to wake up the AP every time, the modem may temporarily store the application packet first, and not wake up the application processor in the terminal.

In an embodiment of the present invention, a modem in a terminal is used to obtain an application packet sent by a network side device; the modem obtains a status of a screen of the terminal from a screen monitoring module in the terminal, where the status of the screen of the terminal includes a screen-on state and a screen-off state; and when the screen is in the screen-off state, an application processor is not woken up, and the obtained application packet is temporarily stored. Compared with the prior art in which an AP is woken up each time an application packet is obtained, in the data processing method according to the embodiment of the present invention, when it is obtained that the screen is in the screen-off state, the obtained application packet is temporarily stored and the AP is not woken up, thereby reducing power consumption of the terminal.

Figure 2:
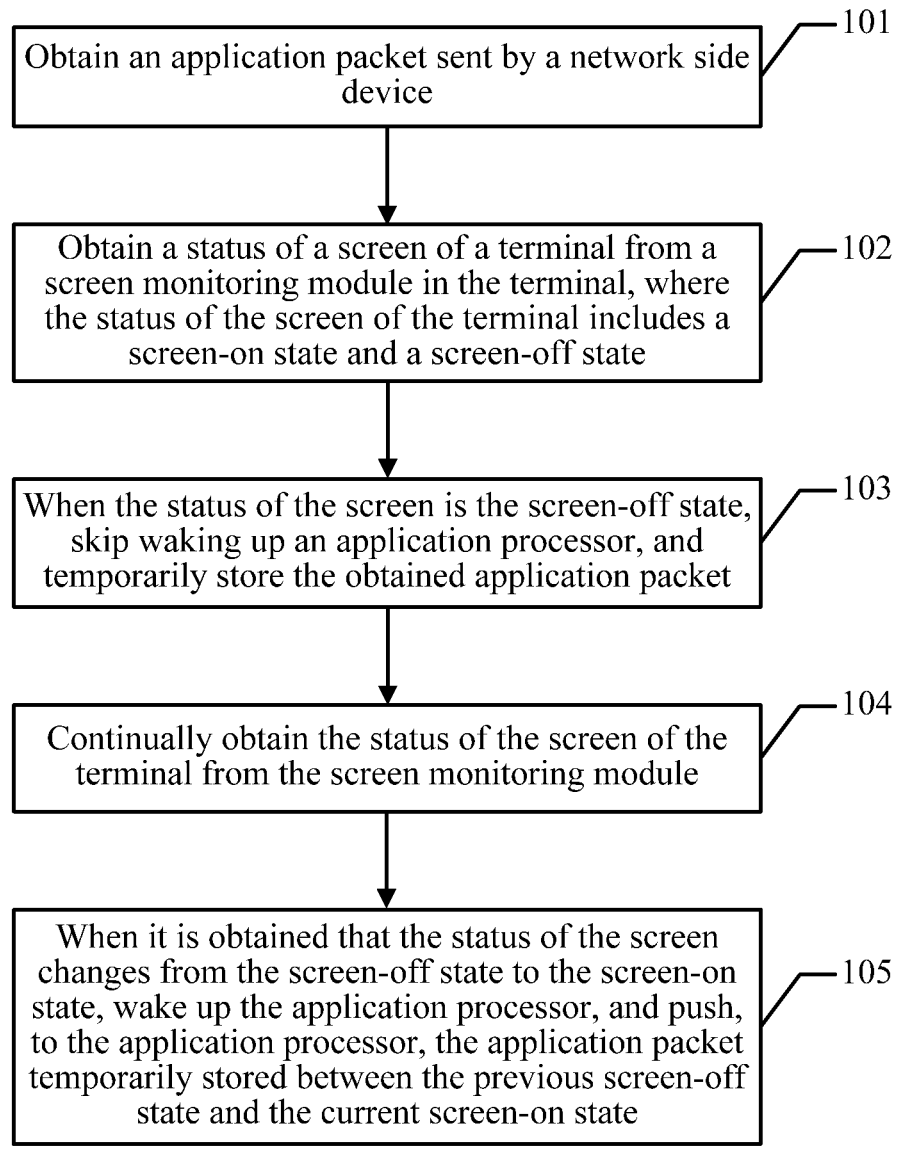
FIG. 2 is a schematic diagram of another embodiment of a data processing method according to the present invention.

Referring to FIG. 2, another embodiment of the data processing method according to the present invention is illustrated. For step 101 to step 103, reference may be made to the corresponding embodiment shown in FIG. 1 for step 101 to step 103, and details are not described herein again; and in addition, the data processing method according to an embodiment of the present invention may further include the following steps after step 103.

Step 104 includes continually obtain the status of the screen of the terminal from the screen monitoring module.

Step 105 includes when it is obtained that the status of the screen changes from the screen-off state to the screen-on state, wake up the application processor, and push, to the application processor, the application packet temporarily stored between the previous screen-off state and the current screen-on state.

In an embodiment of the present invention, a modem may continually obtain information about a status of a screen from a screen monitoring module, for example, a screen-on state and a screen-off state. When the screen is in the screen-off state within a period of time, the modem may have temporarily stored several or more application packets. When it is obtained that the screen is switched from a screen-off state to a screen-on state, it may be determined that a user starts using the terminal, and the several or more application packets that are temporarily stored within the screen-off state period need to be pushed to the application processor.

When the application packets are pushed, it may be that the application packets are pushed in a sequential order in which each application packet is temporarily stored, or it may be that the application packets are pushed together. A pushing order is not limited in the present invention. In this way, not only the number of times the AP is woken up is reduced, but also no effect is caused on the user viewing application information.

Figure 3:
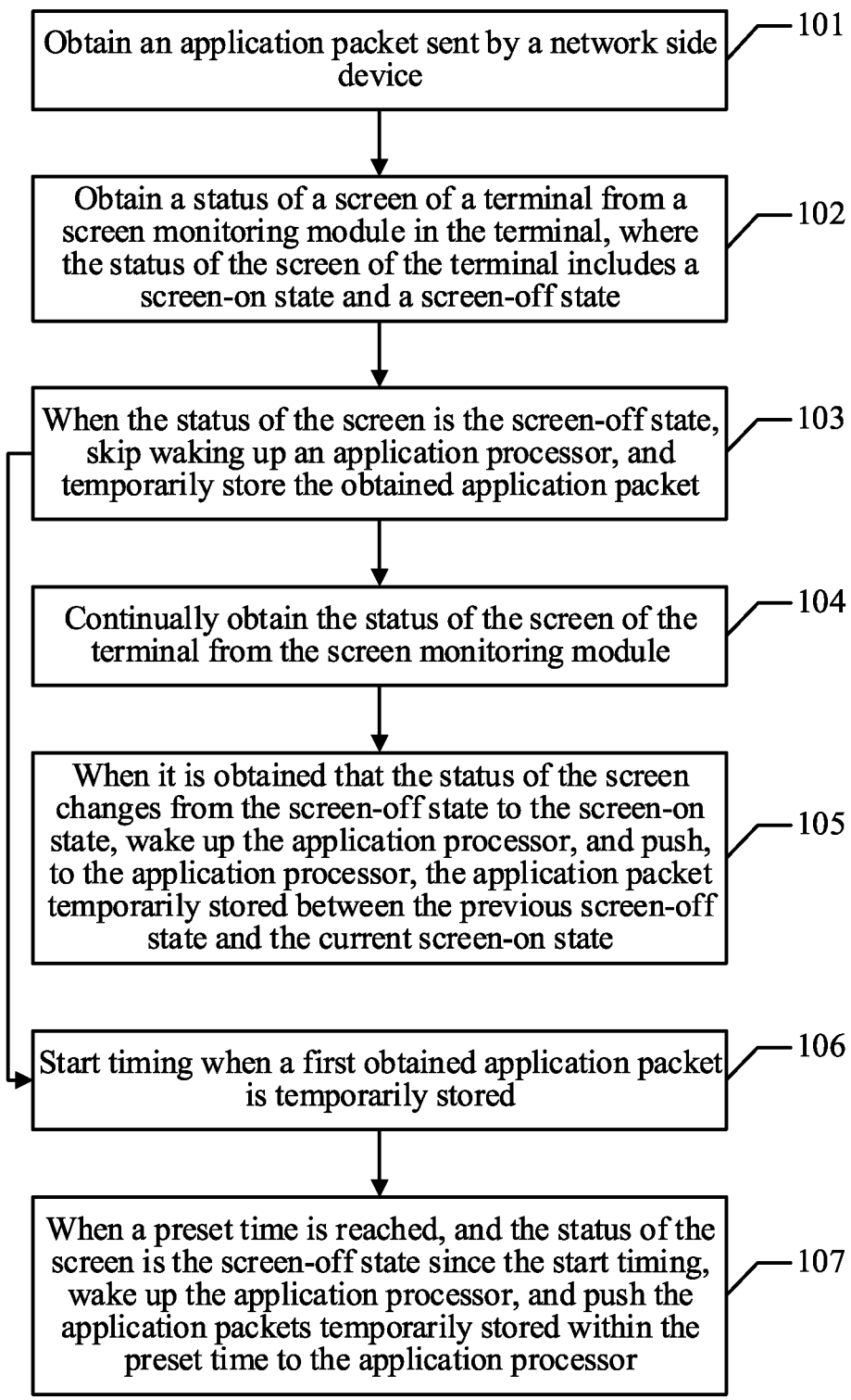
FIG. 3 is a schematic diagram of another embodiment of a data processing method according to the present invention.

Referring to FIG. 3, another embodiment of the data processing method according to the present invention is illustrated. For step 101 to step 103, reference may be made to the corresponding embodiment shown in FIG. 1 for step 101 to step 103, and details are not described herein again; and in addition, the data processing method according to the embodiment of the present invention may further include step 106 and step 107 after step 103, that is, the embodiment of the present invention includes step 101, step 102, step 103, step 106, and step 107.

Still referring to FIG. 3, another embodiment of the data processing method according to the present invention includes step 101 to step 105, where reference may be made to the corresponding embodiment shown in FIG. 2 for step 101 to step 105, and details are not described herein again; and in addition, in the data processing method according to the embodiment of the present invention, step 106 and step 107 may further be performed after step 103 is performed and when step 104 is performed. That is, the embodiment of the present invention includes step 101, step 102, step 103, step 104, step 105, step 106, and step 107.

Step 106 includes starting timing when a first obtained application packet is temporarily stored.

Step 107 includes when a preset time is reached, and the status of the screen is in the screen-off state since the start timing, wake up the application processor, and push the application packets temporarily stored within the preset time to the application processor.

In an embodiment of the present invention, if the screen is in a screen-off state for more than a short period of time, such as since the starting timing, it may result in that a large number of application packets are stored in a modem. Because the modem has limited memory, the embodiment of the present invention provides a solution of short-term storage. Specifically, when the modem starts temporarily storing a first application packet, a timer is started and a preset time for temporary storage may be set to 3 minutes, 5 minutes, or half an hour, and the specific time is not limited. When the preset time is reached, no matter how many application packets are temporarily stored, the AP is woken up, and the temporarily stored application packets are pushed to the AP. When the application packets are pushed, it may be that the application packets are pushed in a sequential order in which each application packet is temporarily stored, or it may be that the application packets are pushed together. A pushing order is not limited in the present invention.

In a scheduled pushing solution provided by the embodiment of the present invention, which is used when a screen is in a screen-off state for more than a short period of time, such as since the starting timing, memory space of a modem may be released at a scheduled time to continue to temporarily store another application packet.

Figure 4:
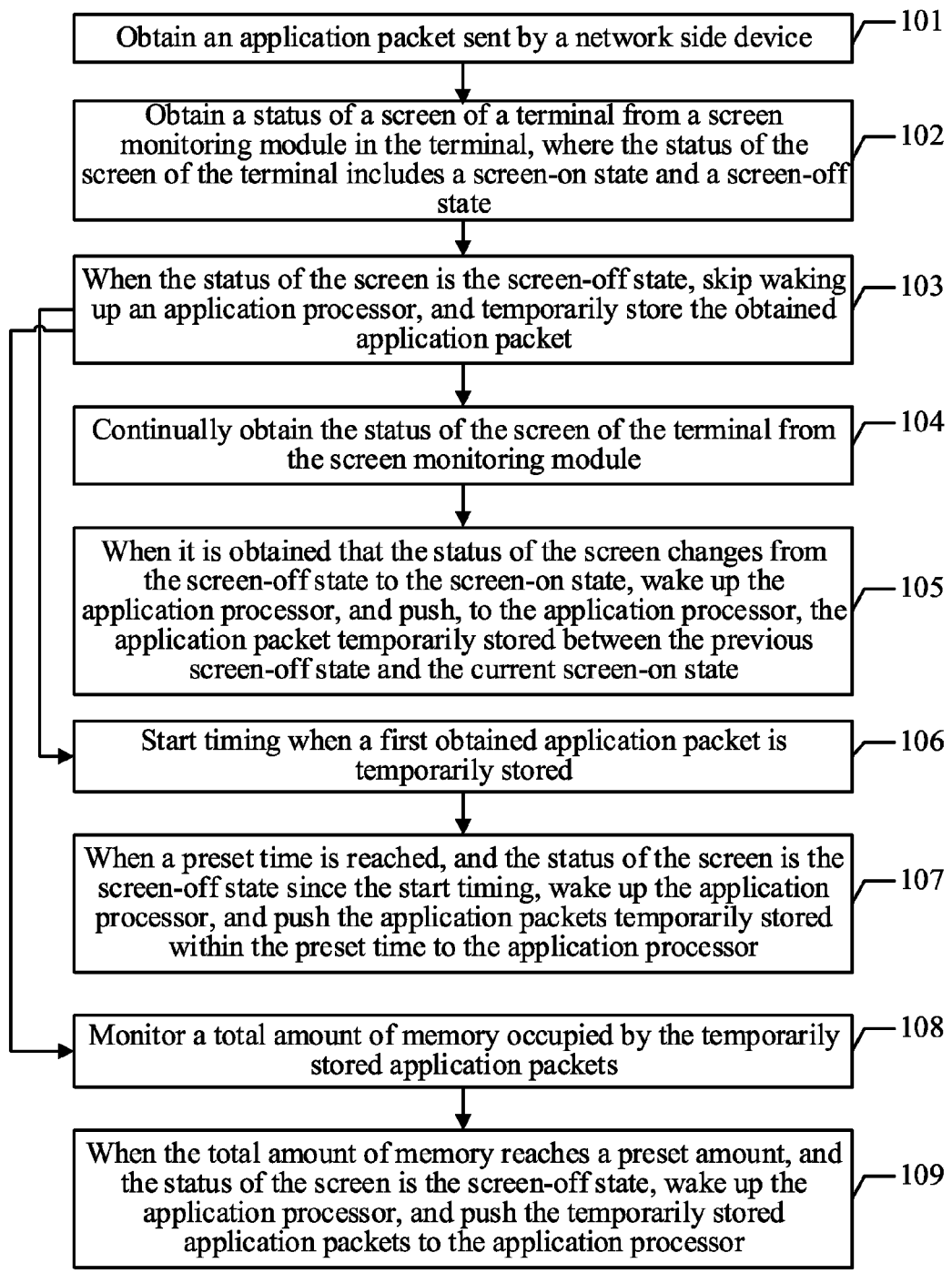
FIG. 4 is a schematic diagram of another embodiment of a data processing method according to the present invention.

Referring to FIG. 4, another embodiment of the data processing method according to the present invention is illustrated. For step 101 to step 103, reference may be made to the corresponding embodiment shown in FIG. 1 for step 101 to step 103, and details are not described herein again; and in addition, in the data processing method according to the embodiment of the present invention, step 108 and step 109 may further be performed after step 103. That is, the embodiment of the present invention includes step 101, step 102, step 103, step 108, and step 109.

Still referring to FIG. 4, another embodiment of the data processing method according to the present invention includes step 101 to step 105, where reference may be made to the corresponding embodiment shown in FIG. 2 for step 101 to step 105, and details are not described herein again; and in addition, in the data processing method according to the embodiment of the present invention, step 108 and step 109 may further be performed after step 103 is performed and when step 104 is performed. That is, the embodiment of the present invention includes step 101, step 102, step 103, step 104, step 105, step 108, and step 109.

Still referring to FIG. 4, another embodiment of the data processing method according to the present invention includes step 101 to step 107, where reference may be made to the corresponding embodiment shown in FIG. 3 for step 101 to step 107, and details are not described herein again; and in addition, in the data processing method provided by the embodiment of the present invention, step 108 and step 109 may further be performed after step 103 is performed and when step 104 and step 106 are performed. That is, the embodiment of the present invention includes step 101, step 102, step 103, step 104, step 105, step 106, step 107, step 108, and step 109.

Step 108 includes monitoring a total amount of memory occupied by the temporarily stored application packets.

Step 109 includes when the total amount of memory reaches a preset amount, and the screen is in the screen-off state, waking up the application processor, and pushing the temporarily stored application packets to the application processor.

If the screen is in the screen-off state for more than a short period of time, it may result in that a large number of application packets are stored in a modem. Because the modem has limited memory, the embodiment of the present invention provides a solution of short-term storage. Specifically, a preset amount may be set as a threshold for a total amount of memory occupied by temporarily stored application packets. When the total amount of occupied memory reaches the preset amount, the AP of the terminal is woken up, and each temporarily stored application packet is pushed to the AP. When the application packets are pushed, it may be that the application packets are pushed in a sequential order in which each application packet is temporarily stored, or it may be that the application packets are pushed together. A pushing order is not limited in the present invention.

In a quantitative pushing solution provided by the embodiment of the present invention, which is used when a screen is in a screen-off state for more than a short period of time, memory space of a modem may be released when an amount of occupied memory reaches a preset amount, to continue to temporarily store another application packet.

Figure 5:
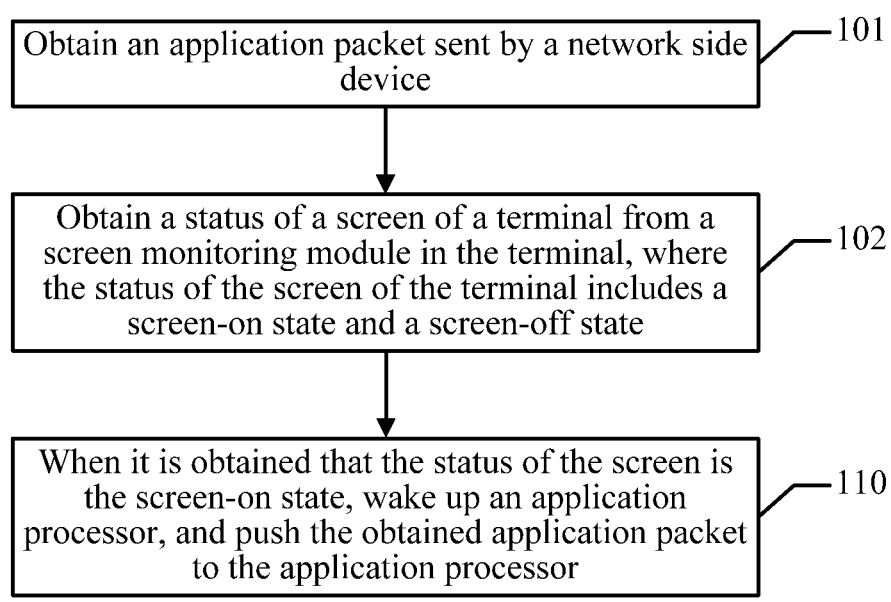
FIG. 5 is a schematic diagram of another embodiment of a data processing method according to the present invention.

Referring to FIG. 5, another embodiment of the data processing method according to the present invention is illustrated. For step 101 and step 102, reference may be made to the corresponding embodiment shown in FIG. 1 for step 101 and step 102, and details are not described in detail herein again; and in addition, the data processing method according to the embodiment of the present invention may further include step 110 after step 102. That is, the embodiment of the present invention includes step 101, step 102, and step 110.

Step 110 includes when it is obtained that the screen is in the screen-on state, wake up an application processor, and push the obtained application packet to the application processor.

In an embodiment of the present invention, if the screen is in a screen-on state when the application packet is obtained, the application packet does not need to be temporarily stored, and is directly pushed to the AP. In this case, a user may view application information in the application packet in a timely manner, thereby improving user experience.

Figure 6:
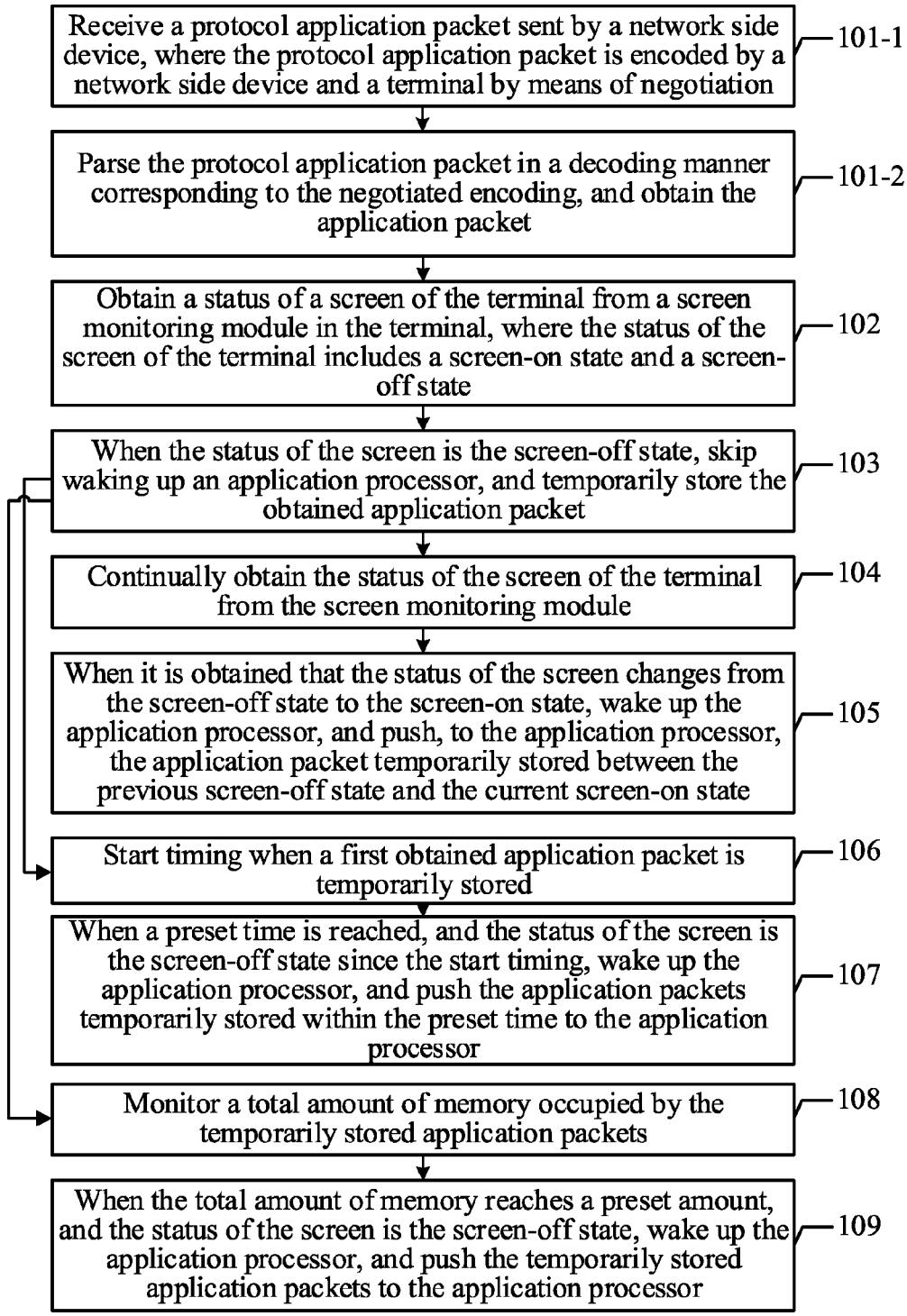
FIG. 6 is a schematic diagram of another embodiment of a data processing method according to the present invention.

Referring to FIG. 6, another embodiment of the data processing method according to the present invention is illustrated. For step 101 to step 103, reference may be made to the corresponding embodiment shown in FIG. 1 for step 101 to step 103, and details are not described herein again; and in addition, in the data processing method according to the embodiment of the present invention, step 101 in FIG. 1 specifically includes the following step 101-1 and step 101-2. That is, the embodiment of the present invention includes step 101-1, step 101-2, step 102, and step 103.

Still referring to FIG. 6, another embodiment of the data processing method according to the present invention includes step 101 to step 105, where reference may be made to the embodiment shown in FIG. 2 for step 101 to step 105, and details are not described herein again; and in addition, in the data processing method according to the embodiment of the present invention, step 101 in FIG. 2 may specifically be the following step 101-1 and step 101-2. That is, the embodiment of the present invention includes step 101-1, step 101-2, step 102, step 103, step 104, and step 105.

Still referring to FIG. 6, another embodiment of the data processing method according to the present invention includes step 101 to step 107, where reference may be made to the embodiment shown in FIG. 3 for step 101 to step 107, and details are not described herein again; and in addition, in the data processing method according to the embodiment of the present invention, step 101 in FIG. 3 may specifically be the following step 101-1 and step 101-2. That is, the embodiment of the present invention includes step 101-1, step 101-2, step 102, step 103, step 104, step 105, step 106, and step 107.

Still referring to FIG. 6, another embodiment of the data processing method according to the present invention includes step 101 to step 109, where reference may be made to the embodiment shown in FIG. 4 for step 101 to step 109, and details are not described herein again; and in addition, in the data processing method according to the embodiment of the present invention, step 101 in FIG. 4 may specifically be the following step 101-1 and step 101-2. That is, the embodiment of the present invention includes step 101-1, step 101-2, step 102, step 103, step 104, step 105, step 106, step 107, step 108, and step 109.

Figure 7:
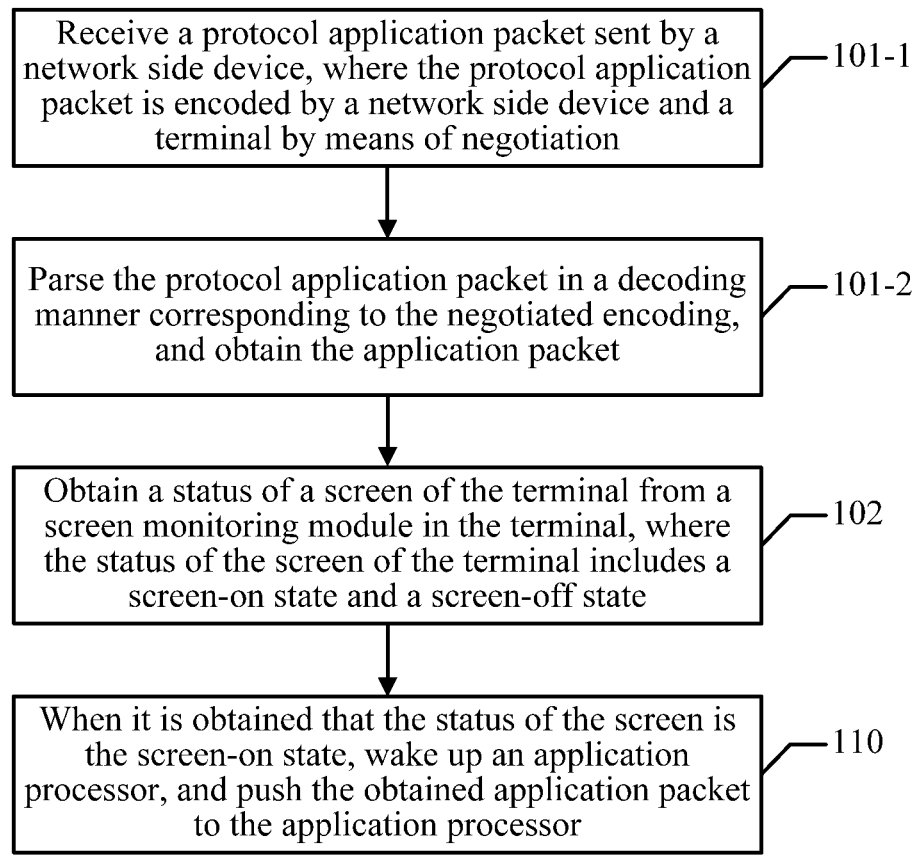
FIG. 7 is a schematic diagram of another embodiment of a data processing method according to the present invention.

Referring to FIG. 7, another embodiment of the data processing method according to the present invention is illustrated. For step 101, step 102, and step 110, reference may be made to the embodiment shown in FIG. 5 for step 101, step 102, and step 110, and details are not described herein again; and in addition, in the data processing method according to the embodiment of the present invention, step 101 in FIG. 5 may specifically be the following step 101-1 and step 101-2. That is, the embodiment of the present invention includes step 101-1, step 101-2, step 102, and step 110.

Step 101-1 includes receiving a protocol application packet sent by the network side device, where the protocol application packet is encoded by a network side device and a terminal by a negotiation protocol.

Step 101-2 includes parsing the protocol application packet in a decoding manner corresponding to the negotiated encoding, and obtaining the application packet.

In an embodiment of the present invention, a packet sent by an application server to the terminal is received by a modem in the terminal. In fact, the modem initially receives a protocol application packet, and the protocol application packet is encoded by the network side device and the terminal by a negotiation protocol. The modem first parses the protocol application packet according to the Point-to-Point Protocol specified in the 3rd Generation Partnership Project (3rd Generation Partnership Project, 3GPP). In fact, a parsing process is implemented to: remove a packet header from the protocol application packet, such as an identifier of the application server that sends the packet; subsequently, perform parsing according to the Transmission Control Protocol/Internet Protocol (Transmission Control Protocol/Internet Protocol, TCP/IP), which is equivalent to further removing information such as an IP address of the terminal that is carried in the protocol application packet; and finally obtain the application packet required by an AP. In the embodiment of the present invention, parsing the protocol application packet in the modem can reduce power consumption of the AP.

Figure 8:
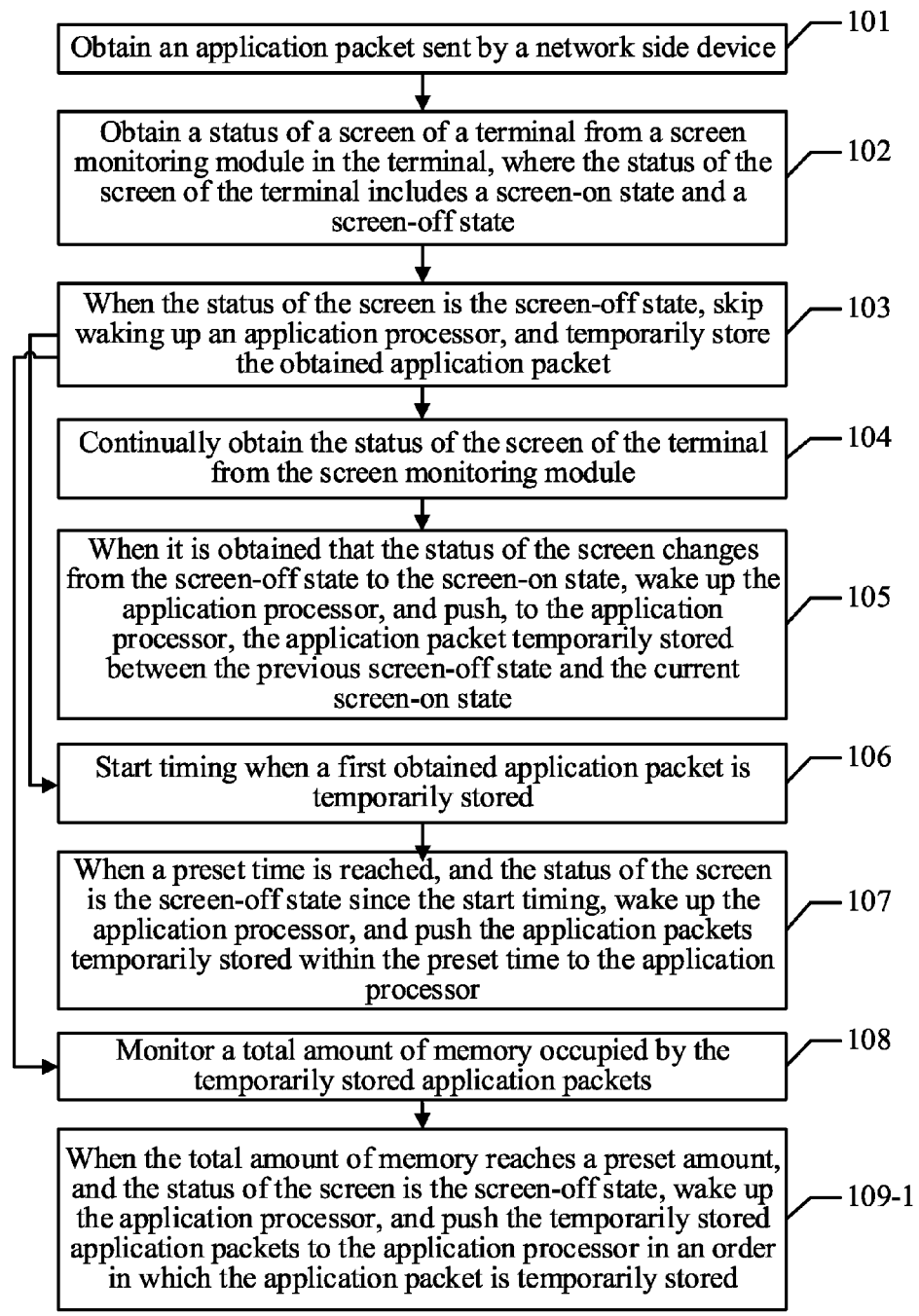
FIG. 8 is a schematic diagram of another embodiment of a data processing method according to the present invention.

Referring to FIG. 8, another embodiment of the data processing method according to the present invention is illustrated. For step 101 to step 103, step 108, and step 109, reference may be made to the embodiment shown in FIG. 4 for step 101 to step 103, step 108, and step 109, and details are not described herein again; and in addition, in the data processing method according to the embodiment of the present invention, step 109 in FIG. 4 may specifically be the following step 109-1. That is, the embodiment of the present invention includes step 101 to step 103, step 108, and step 109-1.

Still referring to FIG. 8, another embodiment of the data processing method according to the present invention include step 101 to step 105, step 108, and step 109, where reference may be made to the embodiment shown in FIG. 4 for step 101 to step 105, step 108, and step 109, and details are not described herein again; and in addition, in the data processing method according to the embodiment of the present invention, step 109 in FIG. 4 may specifically be the following step 109-1. That is, the embodiment of the present invention includes step 101 to step 105, step 108, and step 109-1.

Still referring to FIG. 8, another embodiment of the data processing method according to the present invention includes step 101 to step 109, where reference may be made to the embodiment shown in FIG. 4 for step 101 to step 109, and details are not described herein again; and in addition, in the data processing method according to the embodiment of the present invention, step 109 in FIG. 4 may specifically be the following step 109-1. That is, the embodiment of the present invention includes step 101 to step 108, and step 109-1.

Step 109-1 includes when the total amount of memory reaches a preset amount, and the screen is in the screen-off state, waking up the application processor, and pushing the temporarily stored application packets to the application processor in an order in which the application packets are temporarily stored.

In an embodiment of the present invention, when an application packet is pushed to an AP, a sequential order for pushing may be specified, and pushing may be performed in a sequential order in which temporary storage is performed. In this case, it can be ensured that a first obtained application packet arrives at the AP first. In fact, pushing may also be performed prior to temporary storage, which should not be construed as a limitation to the present invention.

Figure 9:
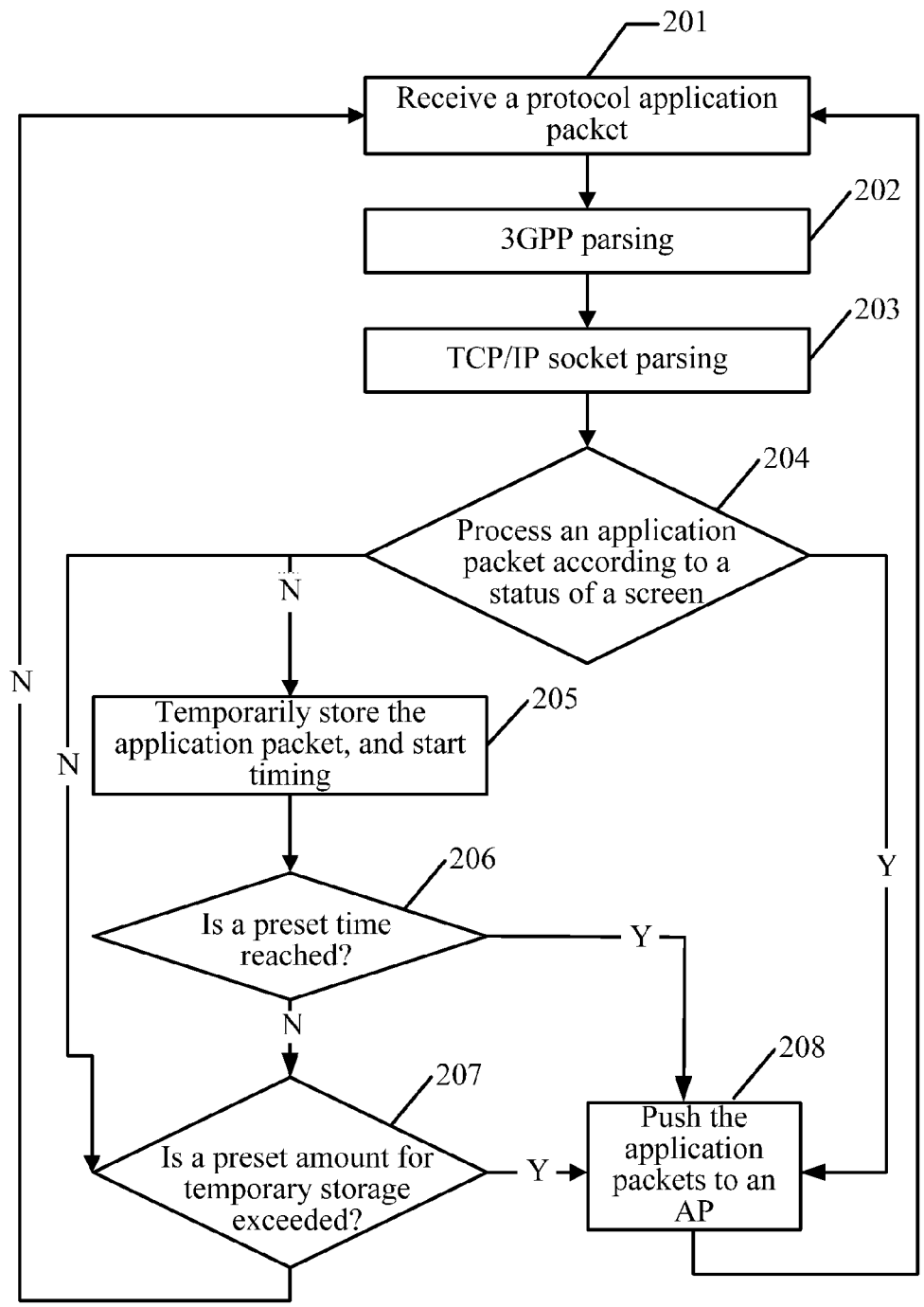
FIG. 9 is a schematic diagram of another embodiment of a data processing method according to the present invention.

For convenience of understanding, referring to FIG. 9, the following uses an application scenario as an example to describe a process of data processing in an embodiment of the present invention.

Step 201 includes a modem receiving a protocol application packet sent from a network side.

Step 202 includes parsing, according to the Point-to-Point Protocol specified in the 3rd Generation Partnership Project (3GPP), the protocol application packet received in step 201.

The parsing process in step 202 is implemented to remove a packet header from the protocol application packet, such as an identifier of an application server that sends the protocol application packet.

Step 203 includes parsing, according to the Transmission Control Protocol/Internet Protocol (Transmission Control Protocol/Internet Protocol, TCP/IP), the protocol application packet parsed in step 202. The parsing process in step 203 in fact is implemented to further remove information such as an IP address of a terminal that is carried in the protocol application packet, and to finally obtain an application packet required by an AP.

Step 204 includes obtaining a status of a screen of a terminal from a screen monitoring module in the terminal, and determining, according to the status of the screen, a method for processing each obtained application packet. The status of the screen of the terminal includes a screen-on state and a screen-off state.

In this step, when the screen is in the screen-on state, step 208 is performed. When the screen is in the screen-off state, step 205 and step 207 may be performed simultaneously, or only one of step 205 and step 207 may be performed. Step 205 and step 207 may be construed as two parallel conditions, one of which may be selected to perform or both of which may be performed together.

Step 205 includes temporarily storing each application packet, and start timing when a first obtained application packet is temporarily stored.

Step 206 includes when a preset time is reached, perform step 208, and when the preset time is not reached, perform step 207.

Step 207 includes determining whether a total amount of memory occupied by each of the temporarily stored application packets reaches a preset amount. When the preset amount is reached, perform step 208, and when the preset amount is not reached, perform step 201.

Step 208 includes pushing each application packet to an application processor AP of the terminal.

Compared with the prior art in which an AP is woken up each time an application packet is obtained, in the data processing method according to the embodiment of the present invention, when it is obtained that the screen is in the screen-off state, the obtained application packet is temporarily stored, and the AP is not woken up, thereby reducing power consumption of the terminal.

Figure 10:
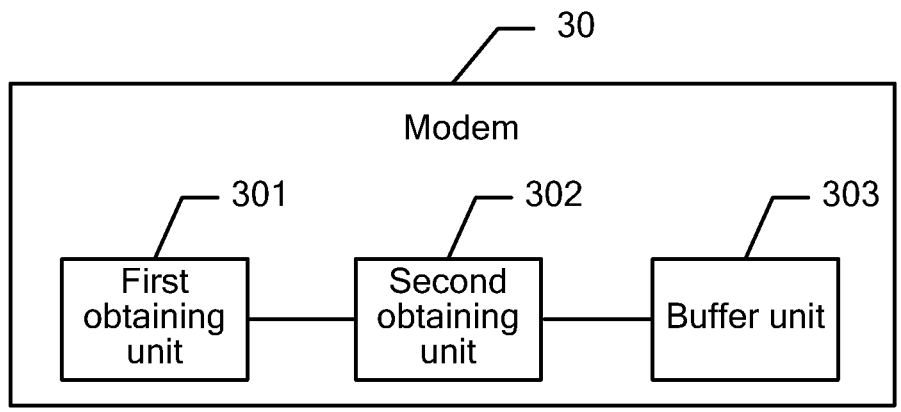
FIG. 10 is a schematic diagram of an embodiment of a modem according to the present invention.

Referring to FIG. 10, an embodiment of a modem 30 according to an embodiment of the present invention includes a first obtaining unit 301 configured to obtain an application packet sent by a network side device, a second obtaining unit 302 configured to obtain a status of a screen of a terminal from a screen monitoring module in the terminal, where the status of the screen of the terminal includes a screen-on state and a screen-off state, and a buffer unit 303. The buffer unit 303 is configured to: when the status of the screen obtained by the second obtaining unit 302 is the screen-off state, skip waking up the application processor, and temporarily store the obtained application packet.

In an embodiment of the present invention, a first obtaining unit 301 obtains an application packet sent by a network side device; a second obtaining unit 302 obtains a status of a screen of the terminal from a screen monitoring module in the terminal, where the status of the screen of the terminal includes a screen-on state and a screen-off state; and when the status of the screen obtained by the second obtaining unit 302 is the screen-off state, a buffer unit 303 does not wake up the application processor, and temporarily store the obtained application packet. Compared with the prior art in which an AP is woken up each time an application packet is obtained, when it is obtained that the screen is in a screen-off state, the modem according to the embodiment of the present invention temporarily stores the obtained application packet, and does not wake up the AP, thereby reducing power consumption of the terminal.

Figure 11:
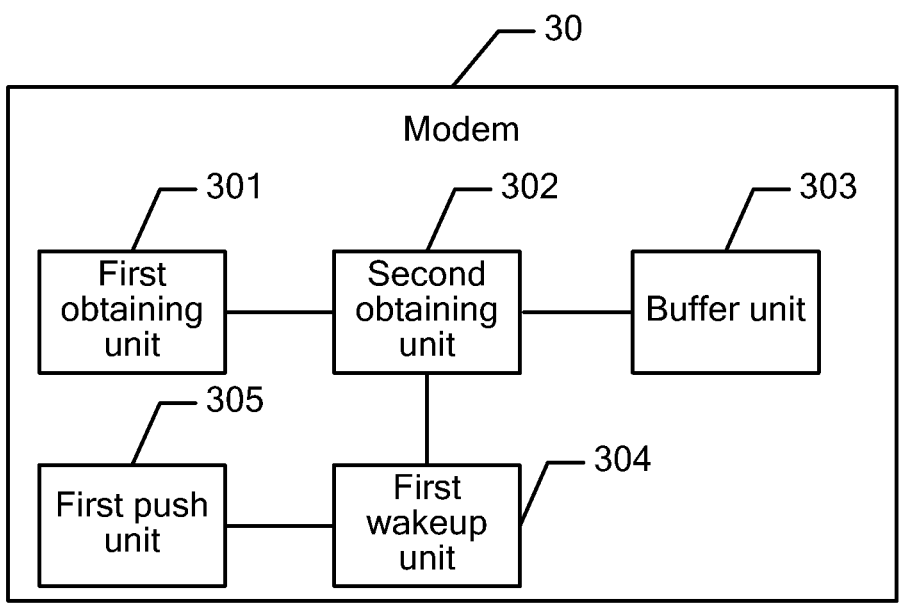
FIG. 11 is a schematic diagram of another embodiment of a modem according to the present invention.

Based on the foregoing embodiment corresponding to FIG. 10 and referring to FIG. 11, in another embodiment of the modem according to the embodiment of the present invention includes the second obtaining unit 302 being further configured to: after the buffer unit temporarily stores the obtained application packet, continually obtain the status of the screen of the terminal from the screen monitoring module. In this embodiment, the modem 30 further includes a first wakeup unit 304, configured to: when the second obtaining unit 302 obtains that the status of the screen changes from the screen-off state to the screen-on state, wake up the application processor, and a first push unit 305, configured to push, to the application processor woken up by the first wakeup unit 304, the application packet temporarily stored between the previous screen-off state and the current screen-on state.

Figure 12:
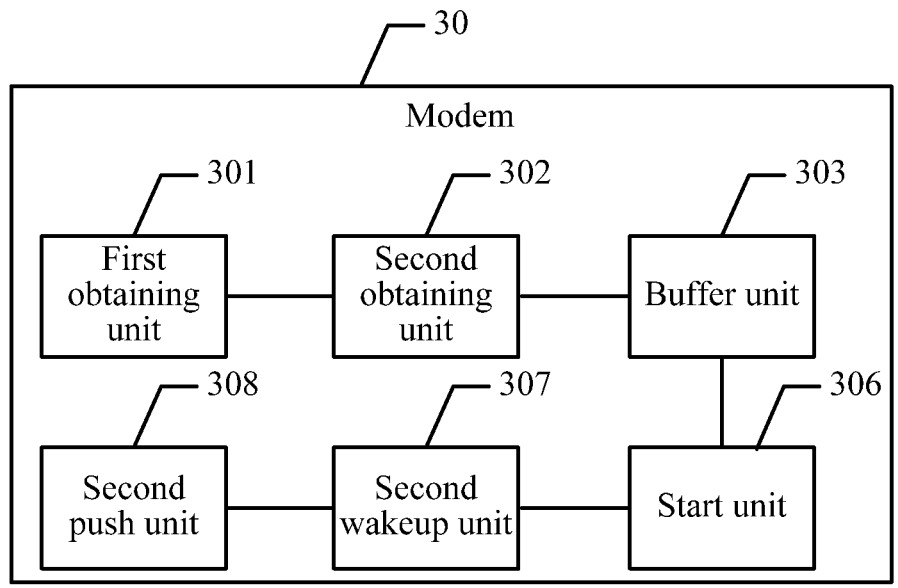
FIG. 12 is a schematic diagram of another embodiment of a modem according to the present invention.

Based on the foregoing embodiment corresponding to FIG. 10 and referring to FIG. 12, in another embodiment of the modem according to the embodiment of the present invention, the modem 30 further includes a start unit 306, configured to start timing when the buffer unit temporarily stores a first obtained application packet, a second wakeup unit 307, configured to: when a preset time is reached and the screen is in the screen-off state since after the start unit 306 starts timing, wake up the application processor, and a second push unit 308, configured to push the application packets temporarily stored within the preset time to the application processor woken up by the second wakeup unit 307.

Figure 13:
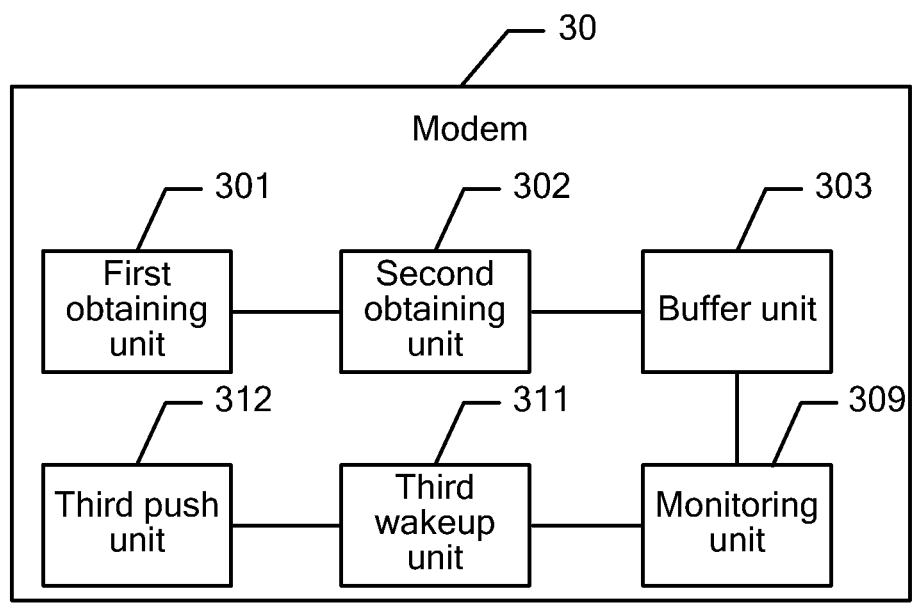
FIG. 13 is a schematic diagram of another embodiment of a modem according to the present invention.

Based on the foregoing embodiment corresponding to FIG. 10 and referring to FIG. 13, in another embodiment of the modem according to the embodiment of the present invention, the modem 30 further includes a monitoring unit 309, configured to monitor a total amount of memory that is occupied by the application packets temporarily stored by the buffer unit, a third wakeup unit 311, configured to: when the total amount of memory monitored by the monitoring unit 309 reaches a preset amount, and the screen is in the screen-off state, wake up the application processor, and a third push unit 312, configured to push the temporarily stored application packets to the application processor woken up by the third wakeup unit 311.

Figure 14:
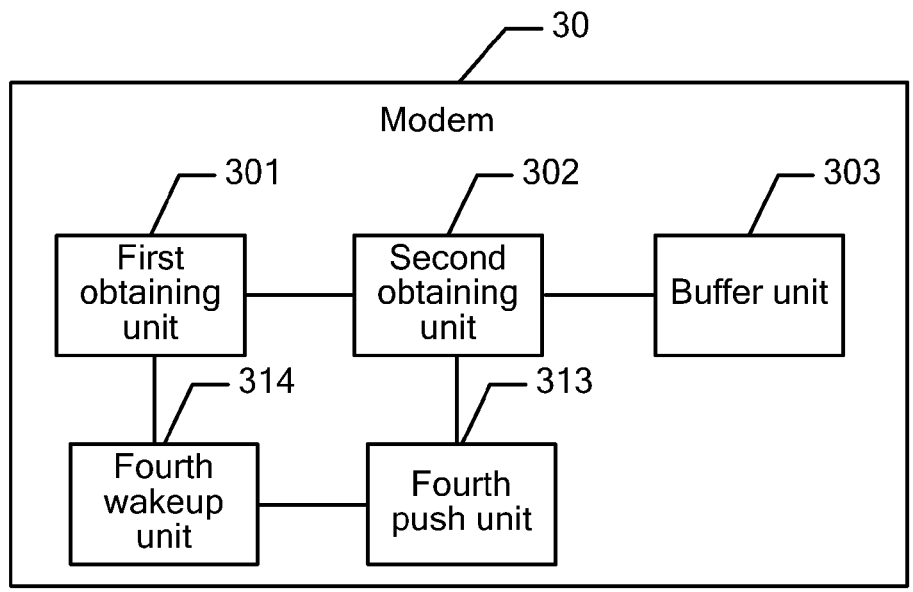
FIG. 14 is a schematic diagram of another embodiment of a modem according to the present invention.

Based on the foregoing embodiment corresponding to FIG. 10 and referring to FIG. 14, in another embodiment of the modem according to the embodiment of the present invention, the modem 30 further includes a fourth wakeup unit 313, configured to: when the second obtaining unit 302 obtains that the screen is in the screen-on state, wake up the application processor, and fourth push unit 314, configured to push, to the application processor woken up by the fourth wakeup unit 313, the application packet obtained by the first obtaining unit 301.

Figure 15:
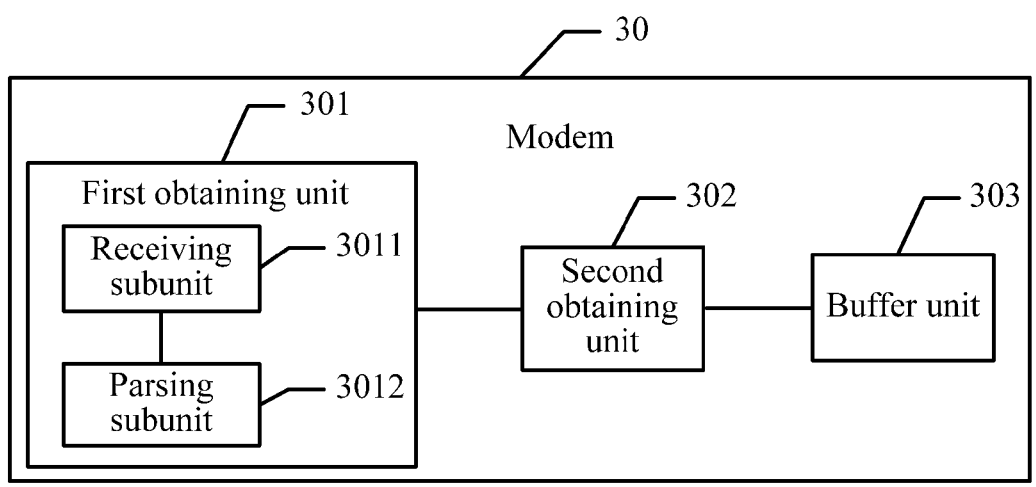
FIG. 15 is a schematic diagram of another embodiment of a modem according to the present invention.

Based on the foregoing embodiment corresponding to FIG. 10 and referring to FIG. 15, in another embodiment of the modem according to the embodiment of the present invention the first obtaining unit 301 includes a receiving subunit 3011, configured to receive a protocol application packet sent by the network side device, where the protocol application packet is encoded by a network side device and the terminal by a negotiation protocol, and a parsing subunit 3012, configured to parse, in a decoding manner corresponding to the negotiated encoding, the protocol application packet received by the receiving subunit 3011, and obtain the application packet.

It should be noted that the first, second, third, and fourth in the embodiments of the present invention are logically used only for clear description. In fact, in terms of hardware, the first wakeup unit, the second wakeup unit, the third wakeup unit, and the fourth wakeup unit may be a same module, and the first push unit, the second push unit, the third push unit, and the fourth push unit may be a same module; and in terms of software-based implementation, they may be a same section of code.

The present invention further provides a computer storage medium, and the medium stores a program. When the program runs, a part or all of the steps of the foregoing data processing method are performed.

Figure 16:
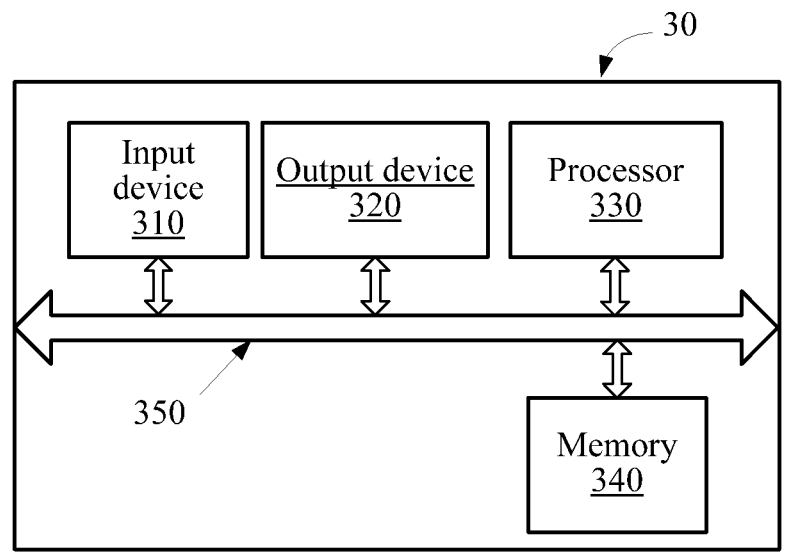
FIG. 16 is a schematic diagram of another embodiment of a modem according to the present invention.

FIG. 16 is a schematic structural diagram of a modem 30 according to an embodiment of the present invention. The modem 30 may include an input device 310, an output device 320, a processor 330, and a memory 340.

The memory 340 may include a read-only memory (ROM) and a random access memory (RAM), and provide an instruction and data for the processor 330. A part of the memory 340 may further include a non-volatile random access memory (NVRAM).

The memory 340 stores an operation instruction, including various operation instructions and used for implementing various operations, and an operating system, including various system programs and used for implementing various basic services and processing a hardware-based task. The memory 340 may store an executable module, or a data structure, or a subset thereof, or an extended set thereof of these elements.

In the embodiment of the present invention, the processor 330 performs the following operations by invoking the operation instruction (the operation instruction may be stored in the operating system) stored in the memory 340: obtaining, by using the input device 310, an application packet sent by a network side device; obtaining a status of a screen of a terminal from a screen monitoring module in the terminal, where the status of the screen of the terminal includes a screen-on state and a screen-off state; and when it is obtained that the screen is in the screen-off state, skipping waking up an application processor, and temporarily storing the obtained application packet.

When it is obtained that the screen is in a screen-off state, the modem according to the embodiment of the present invention may temporarily store the obtained application packet, and does not wake up an AP, thereby reducing power consumption of the terminal.

The processor 330 controls operation of the modem 30, and the processor 330 may also be referred to as a CPU (Central Processing Unit, central processing unit). The memory 340 may include a read-only memory and a random access memory, and provide an instruction and data for the processor 330. A part of the memory 340 may further include a non-volatile random access memory (NVRAM). In a specific application, all components of the modem 30 are coupled together by using a bus system 350, where the bus system 350 may further include a power supply bus, a control bus, a status signal bus, and the like in addition to a data bus. However, for clear description, all buses are marked as the bus system 350 in the figure.

The foregoing method disclosed in the embodiments of the present invention may be applied to the processor 330, or may be implemented by the processor 330. The processor 330 may be an integrated circuit chip, having a capability of processing a signal. In an implementation process, steps of the foregoing method may be completed by using an integrated logic circuit of hardware in the processor 330 or an instruction in a form of software. The foregoing processor 330 may be a general-purpose processor, a digital signal processor (DSP), an application-specific integrated circuit (ASIC), a field programmable gate array (FPGA), or another programmable logic device, discrete gate or transistor logic device, or discrete hardware component, which may implement or execute the method, steps, and logical block diagrams disclosed in the embodiments of the present invention. The general-purpose processor may be a microprocessor, or the processor may also be any conventional processor, or the like. The steps of the method disclosed in the embodiments of the present invention may be executed by a hardware decoding processor directly, or may be executed by a combination of a hardware module and a software module in a decoding processor. The software module may be located in a mature storage medium in the art, such as a random access memory, a flash memory, a read-only memory, a programmable read-only memory, an electrical erasable programmable memory, a register, or the like. The storage medium is located in the memory 340, and the processor 330 reads information in the memory 340 and completes the steps of the foregoing method in combination with hardware thereof.

Optionally, the processor 330 may specifically continually obtain, after the memory temporarily stores the obtained application packet, the status of the screen of the terminal from the screen monitoring module; and when it is obtained that the status of the screen changes from the screen-off state to the screen-on state, wake up the application processor, and the output device 320 may push, to the application processor, the application packet temporarily stored between the previous screen-off state and the current screen-on state.

Optionally, the processor 330 may further start timing when the memory temporarily stores a first obtained application packet, and when a preset time is reached, and the screen is in the screen-off state since the start timing, wake up the application processor, and the output device 320 may further push the application packets temporarily stored within the preset time to the application processor.

Optionally, the processor 330 may further monitor a total amount of memory that is occupied by the application packets temporarily stored by the memory; and when the total amount of memory reaches a preset amount, and the screen is in the screen-off state, wake up the application processor, and the output device 320 may further push the temporarily stored application packets to the application processor.

Optionally, the processor 330 may further wake up the application processor when it is obtained that the screen is in the screen-on state, and the output device 320 may further push the obtained application packet to the application processor.

Optionally, the input device 310 may receive a protocol application packet sent by the network side device, where the protocol application packet is encoded by a network side device and the terminal by a negotiation protocol, and the processor 330 may further parse the protocol application packet in a decoding manner corresponding to the negotiated encoding, and obtain the application packet.

Optionally, the output device 320 specifically may push the temporarily stored application packets to the application processor in an order in which the application packets are temporarily stored.

Figure 17:
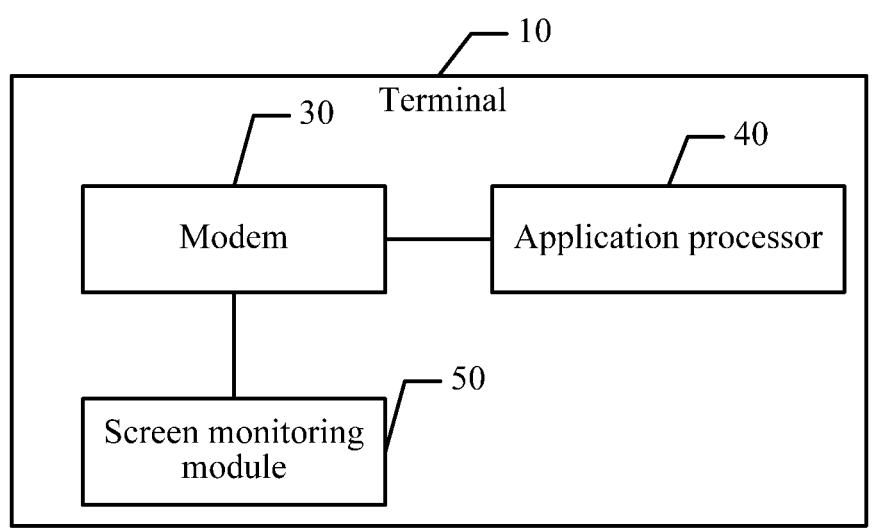
FIG. 17 is a schematic diagram of an embodiment of a terminal according to the present invention.

Referring to FIG. 17, an embodiment of a data processing terminal according to an embodiment of the present invention includes a modem 30, an application processor 40, and a screen monitoring module 50. In this embodiment, the screen monitoring module 50 is configured to monitor a status of a screen of the terminal, where the status of the screen of the terminal includes a screen-on state and a screen-off state. In this embodiment the modem 30 is configured to obtain an application packet sent by a network side device, obtain the status of the screen of the terminal from the screen monitoring module in the terminal, where the status of the screen of the terminal includes a screen-on state and a screen-off state, and when the screen is in the screen-off state, skip waking up the application processor, and temporarily store the obtained application packet. In this embodiment the application processor 40 is configured to receive the application packet sent by the modem after being woken up by the modem.

Compared with the prior art in which an AP is woken up each time an application packet is obtained, when it is obtained that the screen is in a screen-off state, the terminal according to the embodiment of the present invention may temporarily store the obtained application packet, and does not wake up the AP, thereby reducing power consumption of the terminal.

A person of ordinary skill in the art may understand that all or a part of the steps of the methods in the embodiments may be implemented by a program instructing relevant hardware. The program may be stored in a computer readable storage medium. The storage medium may include a ROM, a RAM, a magnetic disk, an optical disc, or the like.

The foregoing describes in detail a data processing method, a modem, and a terminal provided by the embodiments of the present invention. Specific examples are used in this specification to elaborate principles and implementation manners of the present invention. The foregoing description of the embodiments is merely used to help understand the method of the present invention and core ideas thereof. Meanwhile, a person of ordinary skill in the art may make modifications to the specific implementation manners and application scopes according to the idea of the present invention. In conclusion, the content of this specification should not be construed as a limitation to the present invention.

What is claimed is:

1. A data processing method, the method comprising:
    obtaining, by a modem of a terminal, an application packet sent by a network side device;
    obtaining a status of a screen of the terminal, wherein the status of the screen of the terminal comprises a screen-on state and a screen-off state;
    in response to determining that the screen is in in the screen-off state:
        avoiding waking up an application processor; and
        temporarily storing the obtained application packet;
    repeatedly obtaining the status of the screen of the terminal while the screen is in the screen-off state;
    waking up the applications processor in response to determining that the status of the screen changes from the screen-off state to the screen-on state; and
    pushing, to the application processor, the temporarily stored application packet, while changing from the screen-off state to the screen-on state.

2. The method according to claim 1, wherein the method further comprises:
    starting timing when a first obtained application packet is temporarily stored; and
    when a preset time is reached, and if the screen is in the screen-off state since the starting timing:
        waking up the application processor; and
        pushing application packets temporarily stored during the preset time to the application processor.

3. The method according to claim 1, wherein the method further comprises:
    monitoring a total amount of memory occupied by temporarily stored application packets; and
    when the total amount of memory reaches a preset amount, and the screen is in the screen-off state:
        waking up the application processor; and
        pushing the temporarily stored application packets to the application processor.

4. The method according to claim 3, wherein the pushing the temporarily stored application packets to the application processor comprises:
    pushing the temporarily stored application packets to the application processor in an order in which application packets are temporarily stored.

5. The method according to claim 1, wherein when it is obtained that the screen is in the screen-on state:
    waking up the application processor; and
    pushing the obtained application packet to the application processor.

6. The method according to claim 1, wherein the obtaining an application packet sent by a network side device comprises:
    receiving a protocol application packet sent by the network side device, wherein the protocol application packet is encoded by a network side device and the terminal by a negotiation; and
    parsing the protocol application packet in a decoding manner corresponding to the negotiated encoding, and obtaining the application packet.

7. A modem comprising:
    an input device configured to obtain an application packet sent by a network side device;
    a memory; and
    a processor configured to:
        obtain a status of a screen of a terminal from a screen monitoring module in the terminal, wherein the status of the screen of the terminal comprises a screen-on state and a screen-off state;
        in response to determining that the screen is in the screen-off state:
            temporarily store the obtained application packet in the memory; and
            avoid waking up an application processor;
        start a timer in response to temporarily storing the obtained application packet; and
        wake up the application processor in response to reaching a preset period of time after starting the timer.

8. The modem according to claim 7, wherein:
    the processor is further configured to:
        after temporarily storing the obtained application packet, continually obtain the status of the screen of the terminal from the screen monitoring module; and
        when it is obtained that the status of the screen changes from the screen-off state to the screen-on state, wake up the application processor; and
    wherein the modem further comprises an output device configured to push, to the application processor, the application packet temporarily stored before changing from the screen-off state to the screen-on state.

9. The modem according to claim 7, further comprising:
an output device configured to push application packets temporarily stored during the preset period of time to the application processor in response to reaching the preset period of time after starting the timer, wherein the screen remains in the screen-off state during the preset period of time.

10. The modem according to claim 7, wherein:
the processor is further configured to:
monitor a total amount of memory that is occupied by application packets temporarily stored by the memory; and
when the total amount of memory reaches a preset amount, and the screen is in the screen-off state, wake up the application processor; and
wherein the modem further comprises an output device configured to push the temporarily stored application packets to the application processor.

11. The modem according to claim 10, further comprising:
an output device configured to push the temporarily stored application packets to the application processor in an order in which application packets are temporarily stored.

12. The modem according to claim 7, wherein:
the processor is further configured to: when it is obtained that the screen is in the screen-on state, wake up the application processor; and
wherein the modem further comprises an output device configured to push the obtained application packet to the application processor.

13. The modem according to claim 7, wherein:
the input device is configured to receive a protocol application packet sent by the network side device, wherein the protocol application packet is encoded by a network side device and the terminal by a negotiation protocol; and
the processor is further configured to parse the protocol application packet in a decoding manner corresponding to negotiated encoding, and obtain the application packet.

14. A method comprising:
obtaining, by a modem of a terminal, an application packet sent by a network side device;
obtaining a status of a screen of the terminal, wherein the status of the screen of the terminal comprises a screen-on state and a screen-off state;
in response to determining that the screen is in in the screen-off state:
avoiding waking up an application processor; and
temporarily storing the obtained application packet;
monitoring a total amount of memory occupied by temporarily stored application packets; and
waking up the application processor in response to the total amount of memory occupied by the temporarily stored application packets reaching a preset amount of memory.

15. The method of claim 14, further comprising pushing the temporarily stored application packets to the application processor in response to total amount of memory occupied by the temporarily stored application packets reaching the preset amount of memory while the screen is in the screen-off state.

16. The method of claim 15, wherein pushing the temporarily stored application packets to the application processor comprises pushing the temporarily stored application packets to the application processor in an order in which application packets are temporarily stored.

* * * * *